United States Patent [19]

Krider et al.

[11] Patent Number: 4,806,851

[45] Date of Patent: Feb. 21, 1989

[54] THUNDERSTORM SENSOR AND METHOD OF IDENTIFYING AND LOCATING THUNDERSTORMS

[75] Inventors: E. Philip Krider; Alburt E. Pifer; Leon G. Byerley, III, all of Tucson, Ariz.

[73] Assignee: Lightning Location and Protection, Inc., Tucson, Ariz.

[21] Appl. No.: 92,670

[22] Filed: Sep. 3, 1987

[51] Int. Cl.$^4$ .......................................... G01N 31/02
[52] U.S. Cl. .................................. 324/72; 73/170 R; 342/460
[58] Field of Search ............... 73/170 R; 342/460, 26; 340/601; 324/72, 95, 102

[56] References Cited

U.S. PATENT DOCUMENTS

| | | | |
|---|---|---|---|
| 3,715,660 | 2/1973 | Ruhnke | 324/72 |
| 3,754,263 | 8/1973 | Wojtasinski | 342/460 |
| 4,023,408 | 5/1977 | Ryan | 324/72 |
| 4,115,732 | 9/1978 | Krider | 324/72 |
| 4,198,599 | 4/1980 | Krider | 324/72 |
| 4,506,211 | 3/1985 | Coleman | 324/72 |
| 4,672,305 | 6/1987 | Coleman | 324/72 |

Primary Examiner—Reinhard J. Eisenzopf
Assistant Examiner—Jose M. Solis
Attorney, Agent, or Firm—Mason, Kolehmainen, Rathburn & Wyss

[57] ABSTRACT

The thunderstorm sensor of the present invention includes a pair of orthogonally positioned magnetic loop antennas to provide signals representative of the north-south and east-west components of the magnetic field produced by a lightning discharge. The system also includes an omni-directional electric field antenna to provide a signal representative of the electric field produced by a lightning discharge. The magnetic field and electric field signals from the antennas are coupled to an analog signal processor and digitizer which provides digital representations of the peak north-south and peak east-west components of the radiated magnetic field. The analog signal processor and digitizer also provides digital representations of the peak radiated electric field and the electric field sampled at a time subsequent to the time of occurrence of the peak radiated field wherein the second sampled electric field value represents the electrostatic field change due to the lightning discharge. The amplitude of the magnetic field is determined from the digital representations of the north-south and east-west components of the magnetic field. The relative electric field change is determined from the ratio of the second sampled electric field to the peak radiated electric field. The amplitude of the magnetic field and the relative electric field change are compared to respective first and second reference values to determine whether the detected lightning is associated with a thunderstorm within one or more predetermined ranges of the sensor.

23 Claims, 1 Drawing Sheet

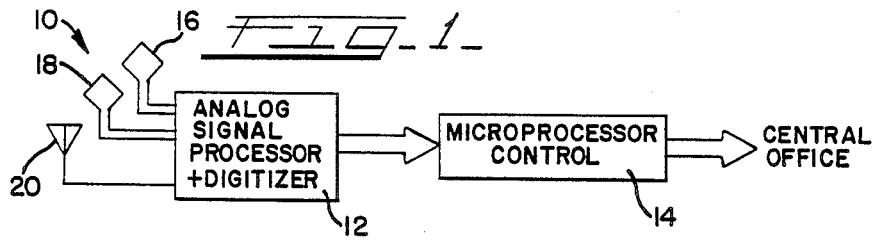
FIG-1
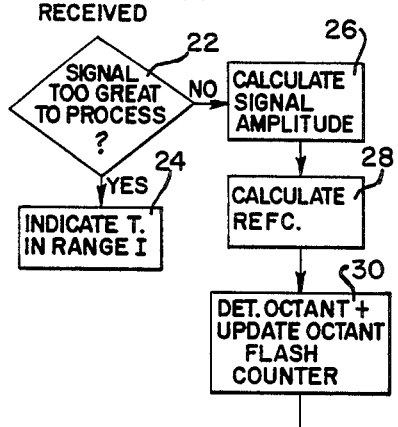
FIG-2
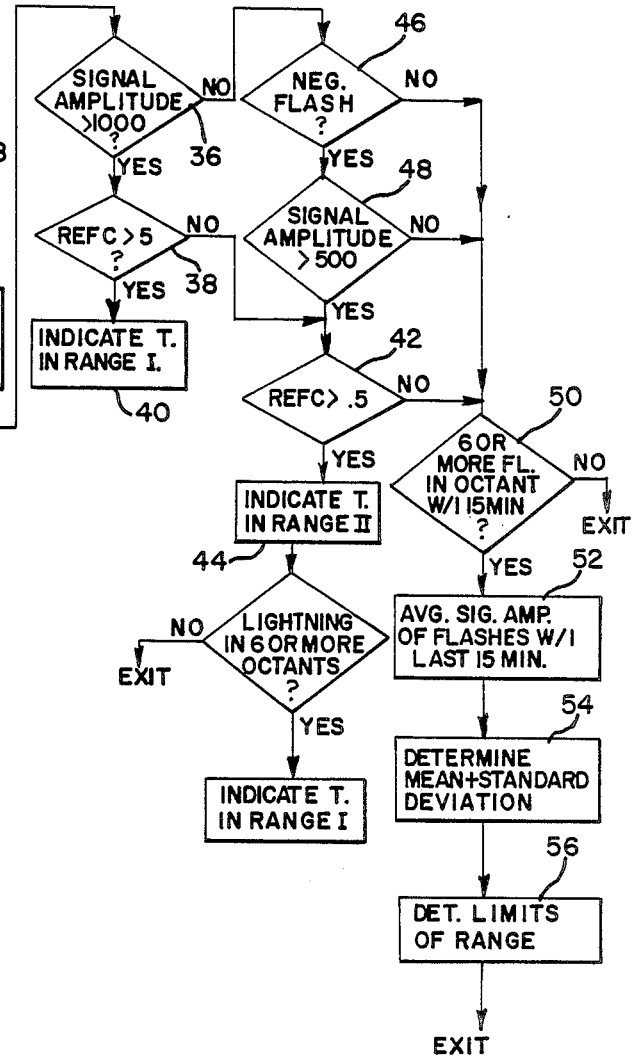

THUNDERSTORM SENSOR AND METHOD OF IDENTIFYING AND LOCATING THUNDERSTORMS

TECHNICAL FIELD

The present invention relates to a thunderstorm sensor and more particularly to such a sensor which is responsive to the amplitude of a radiated field produced by a lightning discharge to ground and to the ratio of two values each indicative of the electric field produced by the lightning discharge to identify thunderstorm activity within a given range of the sensor.

BACKGROUND OF THE INVENTION

Known thunderstorm detection systems have employed lightning sensors to detect and locate thunderstorms. One type of lightning sensor used to locate thunderstorms includes a pair of orthogonal magnetic loop antennas to provide signals representative of the north-south and east-west components of the magnetic field produced by a lightning discharge. This sensor also includes an omni-directional electric field antenna to provide a signal representative of the electric field produced by the lightning discharge. The direction of the lightning discharge is determined from the ratio of the magnetic field components and the polarity of the electric field. However, data from two or more such sensors is required to determine the position of the discharge using triangulation techniques.

The main disadvantage of employing triangulation techniques for determining the location or position of a thunderstorm, is the necessity of having reliable communications between each of the remote sensors and a central station which performs the triangulation. In order to overcome this disadvantage, single sensor thunderstorm detection systems have been developed. Such systems typically use only the amplitude of a sensed field to provide an indication of range. However, because such systems cannot determine whether a signal of a given amplitude represents a weak lightning discharge in close proximity to the sensor or a strong lightning discharge at a distance from the sensor, these systems have been found to provide many false thunderstorm indications.

SUMMARY OF THE INVENTION

In accordance with the present invention, the disadvantages of prior thunderstorm detection systems have been overcome. The system and method of the present invention is responsive to the amplitude of a field produced by a lightning discharge to ground and to the ratio of two values each indicative of the electric field produced by the lightning discharge to identify thunderstorm activity within a given range of the sensor.

More particularly, the thunderstorm sensor of the present invention includes a pair of orthogonally positioned magnetic loop antennas to provide signals representative of the north-south and east-west components of the magnetic field. The system also includes an omni-directional electric field antenna to provide a signal representative of the electric field produced by a lightning discharge. The magnetic field and electric field signals from the antennas are coupled to an analog signal processor and digitizer which provides digital representations of the peak north-south and peak east-west components of the radiated magnetic field as well as digital representations of the peak radiated electric field and electric field sampled at a time subsequent to the time of occurrence of the peak radiated field wherein the second sampled electric field is representative of the electrostatic field change due to the lightning discharge. The amplitude of the magnetic field is determined from the digital representations of the north-south and east-west components of the magnetic field. The relative electric field change is determined from the ratio of the second sampled electric field to the peak radiated electric field. The amplitude of the radiated magnetic field and the relative electric field change are compared to respective first and second reference values to determine whether the detected lightning is associated with a thunderstorm within one or more predetermined ranges of the sensor.

The thunderstorm sensor of the present invention utilizes the relative electric field change to distinguish between weak lightning discharges in close proximity to the sensor and strong lightning discharges at a distance from the sensor to provide a more reliable thunderstorm sensor with fewer false thunderstorm indications than has heretofore been possible.

These and other objects and advantages of the present invention, as well as details of an illustrated embodiment thereof, will be more fully understood from the following description and from the drawing.

BRIEF DESCRIPTION OF THE DRAWING

FIG. 1 is a block diagram of the thunderstorm sensor of the present invention; and FIG. 2 is a flow chart illustrating the range identifying routine utilized by the thunderstorm sensor shown in FIG. 1.

DETAILED DESCRIPTION

The thunderstorm sensor of the present invention as shown in FIG. 1 includes a group of antennas, generally designated 10, for sensing the magnetic and electric fields produced by a lightning discharge. The antennas 10 are coupled to an analog signal processor and digitizer 12 which processes the analog signal outputs of the antennas and identifies those signals that are characteristic of a cloud to ground lightning discharge. The signals of interest associated with a lightning discharge to ground are digitized and coupled to a microprocessor 14 which determines from the digital signals whether a thunderstorm exists within one or more ranges of the sensor. The microprocessor transmits information regarding thunderstorm activity to a central office or station to alert those interested in the activity.

In order to sense the magnetic field, a pair of orthogonally positioned magnetic loop antennas 16 and 18 are provided. The plane of the antenna 16 is positioned to face, for example, in a north-south direction; whereas, the plane of the antenna 18 is positioned to face, for example, in an east-west direction. Consequently, the antenna 16 receives the north-south component of the magnetic field of any lightning discharge and the antenna 18 receives the east-west component thereof. The outputs of the antennas 16 and 18, which are proportional to the time derivative of the received magnetic field signals, are coupled to the analog signal processor and digitizer 12 which integrates the antenna signals to provide signals representative of the north-south and east-west field components themselves.

The electric field of a lightning discharge is sensed by an omnidirectional electric field antenna 20. The output of the antenna 20 represents the time derivative of the sensed electric field. This signal is coupled to the analog signal processor and digitizer 12 which integrates the signal from the antenna 20 to provide a signal representative of the electric field itself.

The analog signal processor and digitizer 12 integrates and filters the signals from the antennas 16, 18 and 20 and from the integrated signals identifies those associated with a cloud to ground lightning discharge as shown in greater detail in U.S. Pat. No. 4,115,732 and U.S. Pat. No. 4,198,599, incorporated herein by reference. The analog signal processor and digitizer 12 samples the analog north-south and east-west magnetic field component signals at their first peak values and converts the peak field values to digital representations thereof for use by the microprocessor control 14. The analog signal processor and digitizer 12 also samples the analog electric field signal at the radiation peak and at a time subsequent thereto wherein the value of the electric field sampled at that subsequent time is representative of the electrostatic field change. The second electric field value may be sampled at some time between 50 microseconds and 1 millisecond after the radiation peak is detected and preferably about 160 microseconds after the peak. The two sampled electric field values are then converted by the analog signal processor and digitizer 12 to digital representations thereof for use by the microprocessor control 14.

The microprocessor control 14 is responsive to the digital representations of the north-south and east-west peak magnetic field components and to the sampled electric field values to determine the range of the thunderstorm activity represented by the lightning discharge to ground field signals. More particularly, and as discussed in detail below, the microprocessor control 14 calculates the amplitude of the peak radiated magnetic field from the peak north-south and east-west radiated magnetic field components. The microprocessor control 14 further calculates the ratio of the second sampled electric field value to the peak radiated electric field value to provide the relative electric field change, REFC. From the signal amplitude of the peak radiated magnetic field and the relative electric field change for each flash detected within a predetermined time interval, the microprocessor control 14 determines whether a thunderstorm exists in a first range of the sensor, such as within zero to three nautical miles of the sensor; whether a thunderstorm exists in a second range of the sensor, such as within three to ten nautical miles of the sensor; and if the thunderstorm activity appears to be outside of the second range, the control 14 calculates the mean range of the thunderstorm activity from the magnetic field data associated with a number of lightning discharges to ground occurring within the same sector and within a predetermined time of each other.

As shown in FIG. 2, the microprocessor control 14 preferably determines the range of thunderstorm activity from the magnetic and electric field data for the first stroke of a flash detected by the sensor although data associated with subsequent strokes may also be utilized. The microprocessor 14, at block 22, first determines whether a signal is too large in amplitude to be processed and if so, at block 24, the microprocessor control determines that a thunderstorm exists in the first range, i.e., within zero to three nautical miles of the sensor. If the signal can be processed, the microprocessor 14, at block 26, calculates the signal amplitude of the radiated magnetic field from the north-south and east-west components thereof. More particularly, the signal amplitude is determined from the square root of the sum of the squares of the radiated magnetic field components. At block 28, the microprocessor 14 calculates the relative electric field change from the ratio of the second sampled electric field value to the peak radiated electric field value. The microprocessor 14, at block 30, determines the octant of a lightning discharge to ground and updates an octant flash counter. The octant of a lightning discharge to ground is determined from the direction of the discharge which is calculated from the arc tangent of the ratio of the magnetic field components and the sign of the electric field signal. The microprocessor 14 also determines the existence of a thunderstorm within the first range if the signal amplitude calculated at block 26 is determined to be greater than a first value such as 1000 and if the relative electrostatic field change is greater than a second value such as 5. More particularly, the microprocessor 14, at block 36, determines whether the signal amplitude calculated at block 26 is greater than 1000 and if it is, the microprocessor proceeds to block 38 to determine whether the relative electric field change is greater than 5. If the signal amplitude is greater than 1000 and the relative electric field change is greater than 5, the microprocessor 14 at block 40, determines that a thunderstorm exists in the first range. The microprocessor also determines the existence of a thunderstorm in the first range if at least one lightning discharge to ground is identified within six or more octants within a predetermined period of time and the data associated with each discharge satisfies the criteria for the second range as discussed below.

The microprocessor control 14 is responsive to both positive and negative flashes to identify a thunderstorm within a second range of the sensor, wherein a positive flash is a flash which lowers positive charge to ground and a negative flash is a flash which lowers negative charge to ground. More specifically, the microprocessor control 14 identifies a thunderstorm within the second range of the sensor, i.e., within three to ten nautical miles of the sensor, if, for a positive or negative flash, the signal amplitude is greater than 1000 and the relative electrostatic field change is greater than 0.5 or, if, for a negative flash, the signal amplitude is greater than 500 and the relative electric field change is greater than 0.5. More particularly, if the microprocessor 14 determines at block 36 that the signal amplitude is greater than 1000 but that the relative electric field change is not greater than 5, the processor proceeds from block 38 to block 42 to determine whether the relative electric field change is greater than 0.5. If the relative electric field change is greater than 0.5 as determined by the processor 14 at block 42, the processor, at block 44 determines that a thunderstorm is within the second range of the sensor. If the microprocessor 14 determines that the signal amplitude is not greater than 1000 at block 34, the processor 14 proceeds to block 46 to determine whether the flash associated with the data is a negative flash. If the data is associated with a negative flash, the microprocessor 14 determines, at block 48, whether the signal amplitude is greater than 500 and if it is, the processor 14 proceeds to block 42. If the signal amplitude for a negative flash is greater than 500 as determined at block 48 and the relative electrostatic field change is greater than 0.5 as determined at block 42, the microprocessor 14 determines that a thunderstorm exists within the second range of the sensor and indicates this at block 44.

The microprocessor control 14 proceeds to block 32 from block 44 to determine whether second range lightning has occurred within six or more octants within a predetermined period of time. If so, the microprocessor 14 at block 34 identifies a thunderstorm in the first range.

When data is received for 6 or more flashes within a single octant within 15 minutes as determined by the microprocessor 14 at block 50, the microprocessor determines the mean range of the thunderstorm and if desired, an upper and lower limit of the range. More particularly, at block 52, the average signal amplitude of the flashes occurring within a given octant within the last 15 minutes is calculated. At block 54, the microprocessor 14 calculates the mean range of the thunderstorm within the octant from a normalization factor K divided by the average amplitude calculated at block 52. At block 54, the microprocessor 14 also calculates the standard deviation of the signal strength. At block 56, the microprocessor determines range limits wherein the upper range limit is equal to the normalization factor, K, divided by the quantity represented by the average calculated at block 52 minus the standard deviation calculated at block 54 and wherein the lower limit is calculated from the normalization factor K divided by the sum of the average calculated at block 52 and the standard deviation calculated at block 54.

The reference values 1000 and 5 were determined experimentally to be typical values of the signal amplitude and the relative electric field change, respectively, for the first stroke of a flash occurring about three nautical miles from the sensor; whereas, the reference values of 1000, 500 and 0.5 were determined experimentally to be typical values of the signal amplitudes and the relative electric field change for the first stroke of respective positive and negative flashes occurring about ten nautical miles from the sensor. These reference values may vary depending on the type of antennas employed in the sensor as well as the calibration of the analog signal processor and digitizer 12. These reference values will also vary if the data used is associated with a stroke subsequent to the first stroke of a flash. Further, although the relative electric field changes REFC, for both positive and negative flashes is shown as being compared to the same value at block 42, for more precise refinements, the REFC for positive and negative flashes may be compared to different values. Although the signal amplitude calculated at block 26 is preferably the amplitude of the magnetic field detected, the amplitude of the electric field may also be used in conjunction with the relative electric field change calculated at block 28 to determine the range of detected thunderstorm activity. Further, although the ratio representing the relative electric field change is preferably formed from the ratio of an electric field value sampled at a time subsequent to the peak radiated electric field and the peak radiated electric field value, the ratio may also be formed from two other values indicative of the electric field wherein the magnitude of one value depends on the magnitude of the other value.

The thunderstorm sensor of the present invention utilizes the relative electric field change as well as the amplitude of the peak magnetic field to distinguish weak lightning discharges close to the sensor from strong lightning discharges a distance from the sensor. Because the sensor is capable of distinguishing such discharges the thunderstorm sensor can provide a more reliable identification of a thunderstorm with fewer false indications than has heretofore been possible with a single sensor.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent is:

1. A thunderstorm sensor comprising:
   means for determining the amplitude of a radiated field produced by a lightning discharge to ground;
   means for determining the relative electric field change of said lightning discharge to ground; and
   means responsive to the field amplitude and to the relative electric field change for identifying thunderstorm activity within a range of the sensor.

2. A thunderstorm sensor as recited in claim 1 wherein said amplitude determining means includes means for sensing the magnetic field produced by a lightning discharge to ground.

3. A thunderstorm sensor as recited in claim 1 wherein said amplitude determining means includes means for sensing the electric field produced by a lightning discharge to ground.

4. A thunderstorm sensor as recited in claim 1 wherein said relative electric field change determining means includes:
   means for sampling the electric field produced by a lightning discharge to ground at a first time and subsequently at a second time to provide respective first and second values representative of the sampled electric field; and
   means for determining the ratio of the second electric field value to the first electric field value to provide the relative electric field change.

5. A thunderstorm sensor as recited in claim 4 wherein said first electric field value represents the peak of the radiated electric field.

6. A thunderstorm sensor comprising:
   means for sensing the electric field produced by a lightning discharge to ground to provide a signal representative thereof;
   means responsive to the electric field signal for determining the ratio of two representations, each indicative of the electric field signal;
   means for determining the amplitude of a field produced by a lightning discharge to ground; and
   means responsive to said field amplitude and to said ratio for identifying thunderstorm activity within a range of the sensor.

7. A thunderstorm sensor as recited in claim 6 wherein said amplitude determining means includes means for sensing the magnetic field produced by a lightning discharge to ground.

8. A thunderstorm sensor as recited in claim 6 wherein said amplitude determining means includes means for sensing the electric field produced by a lightning discharge to ground.

9. A thunderstorm sensor as recited in claim 6 wherein one of said two representations indicative of the electric field signal represents the peak of the radiated electric field.

10. A thunderstorm sensor as recited in claim 9 wherein the other of said representations represents the electric field sampled at a time subsequent to the time of the peak of the radiated field.

11. A thunderstorm sensor comprising:
means for sensing the magnetic and electric fields produced by a lightning discharge to provide signals representative thereof;
means responsive to the magnetic field and electric field signals for determining the occurrence of a lightning discharge to ground within a given range of the sensor;
means responsive to the electric field signal for determining a ratio of two representations, each indicative of the electric field signal; and
means responsive to said ratio for confirming said range.

12. A thunderstorm sensor as recited in claim 11 wherein one of said two representations indicative of the electric field represents the peak of the radiated electric field.

13. A thunderstorm sensor as recited in claim 12 wherein the other of said values represents the electric field sampled at a time subsequent to the time of the peak of the radiated electric field.

14. A thunderstorm sensor comprising:
means for sensing the magnetic and electric fields produced by a lightning discharge to provide signals representative thereof;
means responsive to the magnetic field and electric field signals for determining the occurrence of a lightning discharge to ground within a given range of the sensor;
means responsive to the electric field signal for determining a ratio of two representations each indicative of the electric field signal; and
means responsive to said ratio for determining whether said lightning discharge is close to the sensor or a distance from the sensor.

15. A thunderstorm sensor as recited in claim 14 wherein one of said two representations indicative of the electric field represents the peak of the radiated electric field.

16. A thunderstorm sensor as recited in claim 15 wherein the other of said representations represents the electric field sampled at a time subsequent to the time of the peak radiated electric field.

17. A method for detecting thunderstorms comprising:
sensing at a first location the magnetic and electric fields produced by a lightning discharge;
identifying the fields associated with a lightning discharge to ground;
determining the peak amplitude of the sensed magnetic field associated with said lightning discharge to ground;
determining a ratio of two values indicative of the sensed electric field of said lightning discharge to ground;
comparing said peak amplitude to a first value;
comparing said ratio to a second value; and
identifying a thunderstorm within a given range of said first location if said the peak amplitude of the magnetic field is greater than the first value and said ratio is greater than the second value.

18. The method of claim 17 wherein the step of sensing said fields includes the step of providing signals representative of said fields, the method further including the steps of determining whether the signals representing the fields are too great to be processed; and identifying a thunderstorm within the proximity of the sensor if the signals are too large in amplitude to be processed.

19. The method of claim 17 further including the step of determining the sector in which a lightning discharge to ground occurs; determining whether lightning discharges to ground have occurred within a plurality of sectors within a predetermined time of each other; and identifying a thunderstorm within the proximity of the sensor if lightning discharges have occurred within a plurality of sectors within said predetermined time.

20. The method of claim 17 further including the step of determining the sector in which a lightning discharge to ground occurs; averaging the peak amplitudes of the magnetic fields associated with a plurality of lightning discharges to ground occurring within the same sector within a predetermined time of each other; calculating a mean range of a thunderstorm represented by said lighting discharges from said average.

21. The method of claim 17 further including the step of determining whether said lightning discharge to ground is positive or negative and wherein said peak amplitude is compared to one first value if said discharge is positive and to another first value if said discharge is negative.

22. The method of claim 17 further including the step of determining whether said lightning discharge to ground is positive or negative and wherein said ratio is compared to one first value if said discharge is positive and to another first value if said discharge is negative.

23. A method for detecting thunderstorms comprising:
sensing at a location the electric fields produced by lightning discharges;
identifying an electric field associated with a lightning discharge to ground;
determining the peak amplitude of a radiated electric field associated with said lightning discharge to ground to provide a value representative thereof;
sampling the electric field at a time subsequent to said peak radiated field to provide a value representative of the electrostatic field change due to said lightning discharge;
determining a ratio of the subsequent sampled field value to the peak radiated field value; and
identifying a thunderstorm within a given range of the sensing location in response to said peak amplitude value and said ratio.

* * * * *